United States Patent
Yamamoto et al.

(10) Patent No.: US 6,816,765 B2
(45) Date of Patent: Nov. 9, 2004

(54) MOTOR-DRIVEN POWER STEERING CONTROL APPARATUS

(75) Inventors: Munenori Yamamoto, Tokyo (JP); Takayuki Kifuku, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/379,341

(22) Filed: Mar. 7, 2003

(65) Prior Publication Data

US 2004/0064228 A1 Apr. 1, 2004

(30) Foreign Application Priority Data

Sep. 30, 2002 (JP) ........................................ 2002-286872

(51) Int. Cl.[7] ........................... G06F 17/00; G06F 19/00
(52) U.S. Cl. ........................... 701/41; 701/42; 180/407; 180/443; 180/446
(58) Field of Search ..................... 701/41, 42; 180/404, 180/407, 422, 443, 446

(56) References Cited

U.S. PATENT DOCUMENTS

| | | | | |
|---|---|---|---|---|
| 4,499,964 A | * | 2/1985 | Abe et al. ................ | 180/422 |
| 4,656,409 A | * | 4/1987 | Shimizu ................... | 318/689 |
| 4,727,950 A | * | 3/1988 | Shimizu et al. ........... | 180/446 |
| 5,053,966 A | * | 10/1991 | Takahashi et al. ........ | 701/41 |
| 5,182,711 A | * | 1/1993 | Takahashi et al. ........ | 701/41 |
| 6,052,633 A | * | 4/2000 | Fukuyama et al. ....... | 701/41 |
| 6,390,229 B1 | * | 5/2002 | Kaji ......................... | 180/443 |

FOREIGN PATENT DOCUMENTS

| JP | 9-290764 | 11/1997 |
|---|---|---|
| JP | 11-115789 | 4/1999 |
| JP | 2001-122142 | 5/2001 |
| JP | 2001-163230 | 6/2001 |

* cited by examiner

*Primary Examiner*—Gertrude A. Jeanglaude
(74) *Attorney, Agent, or Firm*—Sughrue Mion, PLLC (57) ABSTRACT

A motor-driven power steering control apparatus for determining pertinent timings for starting/stopping application of steering assist torque includes a motor for applying an assist torque, a sensor for detecting a steering torque, a driving unit for operating the motor in dependence on a detected steering torque, a command unit for commanding starting and stopping of operation of the motor, and a motor operation decision unit. When stopping of operation of the motor is commanded by the command unit, the motor operation decision unit stops driving operation of the motor while commanding the driving unit to stop application of the steering assist torque when a state in which a steering torque is not greater than a predetermined value for stoppage has continued for a predetermined time period.

20 Claims, 9 Drawing Sheets

MOTOR-DRIVEN POWER STEERING CONTROL APPARATUS

BACKGROUND OF THE INVENTION

1. Field of the Invention

The present invention generally relates to a motor-driven power steering control apparatus designed for controlling application of a steering assist force or torque generated by an electric motor to a steering system of a motor vehicle for assisting an operator or driver in his or her steering manipulation. More particularly, the present invention is concerned with a control which is carried out upon starting and stopping of driving operation of the electric motor mentioned above.

2. Description of Related Art

The conventional motor-driven power steering control apparatus for controlling application of an steering assist force or torque in driving a motor vehicle as generally known in the art is so designed as to detect a steering torque of a steering system of the motor vehicle for generating a steering assist torque by means of an electric motor on the basis of a detection signal indicative of the active steering torque to thereby reduce or mitigate the steering effort of the operator or driver.

By way of example, in the hitherto known or conventional motor-driven power steering control apparatus, a steering wheel or handle is operatively coupled to a steering column so that a steering torque applied to the steering wheel by the driver is transmitted to the steering column. A torque sensor is provided in association with the steering column and is so designed as to supply an electric signal indicative of the detected steering torque to a control processor circuit. The control processor circuit is constituted by a CPU (Central Processing Unit), a ROM (Read-Only Memory), a RAM (Random Access Memory), I/O (Input/Output) circuits, a PWM (Pulse-Width Modulation) circuit and an A/D (Analogue-to-Digital) converter circuit.

The control processor circuit is designed to make decision as to application of the steering assist torque as well as stoppage thereof by making use of an ignition signal indicating turn-on/off of an ignition switch and an engine rotation speed signal (rpm signal) outputted from an engine rotation speed sensor. Further, when the steering assist torque is to be applied, the control processor circuit starts driving operation of the electric motor electrically connected to a battery by way of a bridge circuit on the basis of a vehicle speed signal outputted from a vehicle speed sensor, a steering torque signal outputted from the torque sensor and a current detection signal outputted from a current detecting circuit which is designed to detect the electric current flowing through the electric motor, whereby a steering assist torque is applied to the steering system. For particulars, reference may have to be made to Japanese Patent Application Laid-Open Publication No. 290764/1997 (JP-A-9-390764), p. 9, FIG. 1.

The conventional motor-driven power steering control apparatus of the structure mentioned above is disadvantageous in the respect that when application of the steering assist torque is immediately stopped in response to opening or turn-off of the ignition switch of the motor vehicle, a counter steering torque (steering force or torque in the reverse direction) may be put into effect due to restoration effort of the tires from the twisted state brought about by the steering assist torque applied during the steering manipulation, as a result of which the active steering torque changes or varies rapidly, incurring steep increase of the steering force or torque required for the driver. Under the circumstances, such measures are generally adopted that application of the steering assist torque is not interrupted or stopped until the active steering torque has become smaller than a predetermined value inclusive thereof after issuance of the command for stopping application of the steering assist torque, with a view to preventing or suppressing occurrence of variation of the active steering torque. However, in case the driver steers counter or quickly in the course of steering manipulation, application of the steering assist torque is instantaneously stopped at a time point when the steering torque transiently becomes neutral (i.e., upon passing by a neutral point), the steering force or effort required for the driver will steeply increase to make uncomfortable the steering operation, giving rise to a problem. Besides, the conventional motor-driven power steering control apparatus suffers a problem that the application of the steering assist torque may erroneously be determined under the disturbance of noise.

SUMMARY OF THE INVENTION

In the light of the state of the art described above, it is an object of the present invention to provide a motor-driven power steering control apparatus which can properly determine a timing or time point at which application of the steering assist torque is started or stopped.

In view of the above and other objects which will become apparent as the description proceeds, there is provided according to a general aspect of the present invention a motor-driven power steering control apparatus for a motor vehicle which apparatus includes an electric motor for applying a steering assist torque to a steering system, a torque sensor for detecting a steering torque of the steering system of the motor vehicle, a motor driving unit for operating the electric motor in dependence on a detected value of the steering torque, a motor operation command unit for commanding starting and stopping of driving operation of the electric motor, and a motor operation decision unit for deciding starting and stopping of the driving operation of the electric motor on the basis of a command issued by the motor operation command unit. The motor operation decision unit is so arranged that when stopping of the driving operation of the electric motor is commanded by the motor operation command unit, the motor operation decision unit stops the driving operation of the electric motor while commanding the motor driving unit to stop application of the steering assist torque, provided that a state in which a detected value of the steering torque is not greater than a value predetermined for stopping the driving operation of the electric motor has continued for a time period predetermined for the stoppage.

By virtue of the arrangement described above, there can be realized the motor-driven power steering control apparatus which is capable of determining the steering status accurately, whereby the application of the steering assist torque can be stopped by interrupting the motor current at an appropriate timing while suppressing the torque variation due to kickback and ensuring comfortableness for the steering manipulation.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views.

Embodiment 1

Figure 1:
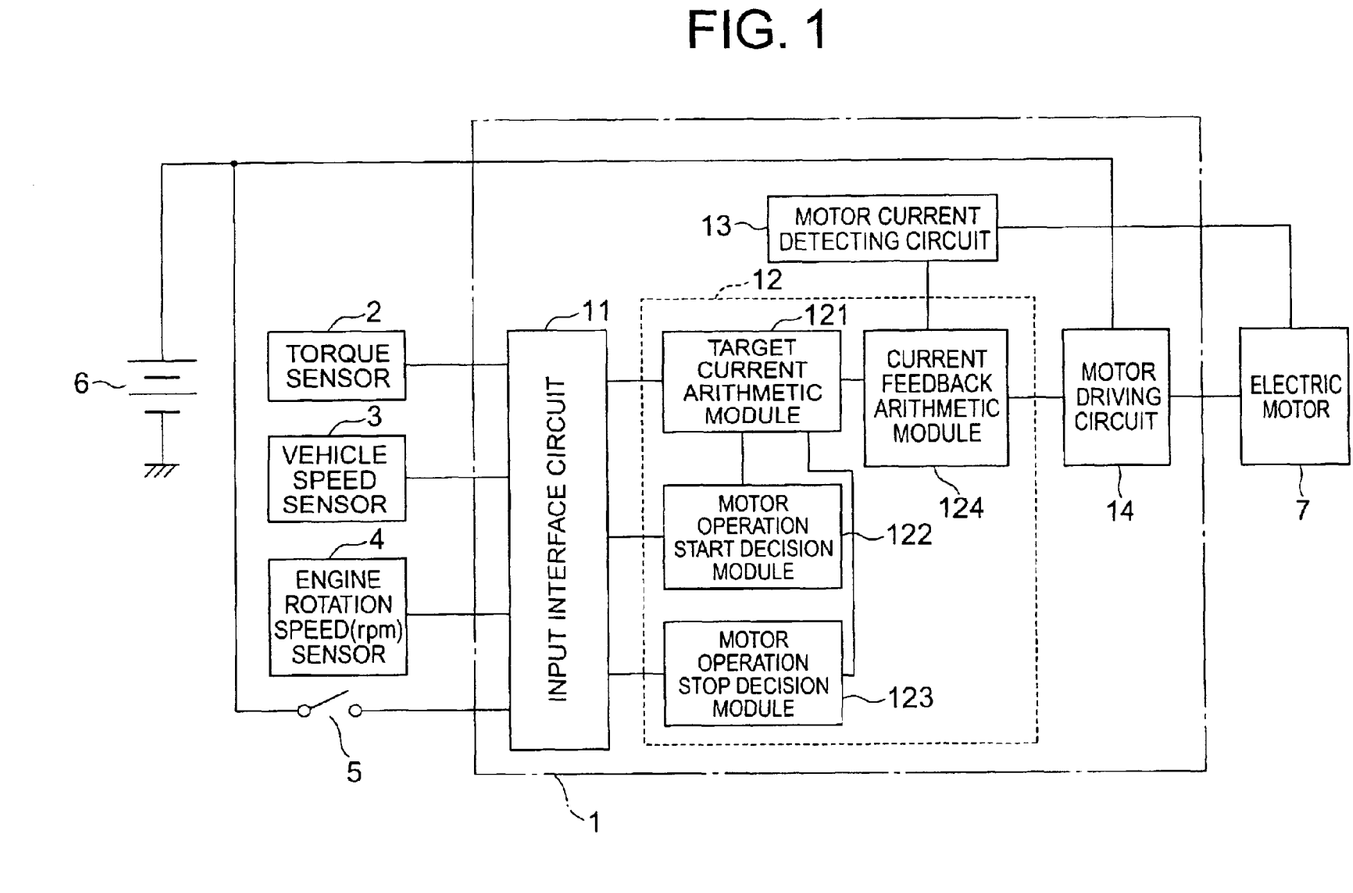
FIG. 1 is a block diagram showing an arrangement of a motor-driven power steering control apparatus according to a first embodiment of the present invention.

Now, description will be made of the motor-driven power steering control apparatus according to a first embodiment of the present invention. FIG. 1 is a block diagram showing a configuration of the motor-driven power steering control apparatus according to the first embodiment of the invention.

Referring to FIG. 1, the motor-driven power steering control apparatus generally denoted by reference numeral 1 is connected to a torque sensor (steering torque detecting means) 2, a vehicle speed sensor 3, an engine rotation speed sensor 4, an ignition switch 5, a battery 6 and an electric motor 7.

The torque sensor 2 is designed to detect a steering torque applied by a driver of a motor vehicle (not shown), while the vehicle speed sensor 3 is designed to detect the speed of the motor vehicle. The engine rotation speed sensor 4 serves for detecting the rotation number or speed (rpm) of an engine of the motor vehicle.

A steering torque signal derived from the output of the torque sensor 2, a vehicle speed signal from the vehicle speed sensor 3, an engine rotation speed signal from the engine rotation speed sensor 4 and an ignition signal derived from the output of the ignition switch 5 are inputted to the motor-driven power steering control apparatus 1. The motor-driven power steering control apparatus 1 includes an input interface (I/F) circuit 11 which serves for converting the steering torque signal, the vehicle speed signal, the engine rotation speed signal and the ignition signal to the corresponding electric signals so that these signals can be processed by a microcomputer 12 which incorporates therein a motor driving means, a motor operation command module and a motor operation decision means.

A current detecting circuit (constituting a part of the motor driving means) 13 is designed to detect magnitude of a motor current flowing through the electric motor 7 (hereinafter also called motor current), the detected motor current being then converted into an electric signal which can be processed by the microcomputer 12.

A target current arithmetic module (constituting another part of the motor driving means) 121 incorporated in the microcomputer 12 arithmetically determines a desired or target value of the motor current for allowing the electric motor 7 to output a desired steering assist force or torque on the basis of the steering torque signal, the vehicle speed signal, the engine rotation speed signal and the ignition switch signal supplied from the input interface circuit 11 and a current detection signal indicating the motor current detection value derived from the output of the current detecting circuit 13.

A motor operation start decision module (serving as motor operation command means and motor operation decision means) 122 is designed or programmed to make decision whether or not application of the steering assist torque is to be started on the basis of the ignition switch signal, the engine rotation speed signal and various failure decision signals.

On the other hand, a motor operation stop decision module (serving as the motor operation command means and the motor operation decision means) 123 is so designed or programmed as to decide whether or not the application of the steering assist torque is to be stopped on the basis of the steering torque signal, the ignition switch signal, the engine rotation speed signal and the various failure decision signals.

Further, a current feedback (F/B) arithmetic module (serving as the motor driving means) 124 is designed to perform a current feedback control (hereinafter also referred to as the current F/B control) on the basis of a desired or target motor current value arithmetically determined by the target current arithmetic module 121 and the motor current detection value detected by the current detecting circuit 13 to thereby determine arithmetically the value of the voltage to be applied to the electric motor 7 so that the difference between the motor current detection value and the target motor current value becomes zero.

A motor driving circuit (serving as the motor driving means) 14 carries out a PWM driving of the electric motor 7 with the battery 6 employed as the power supply source in such a manner that the voltage applied to the electric motor 7 assumes a value equal to that resulting from the arithmetic operation for determining the voltage to be applied to the electric motor 7 as carried out by the current feedback (F/B) arithmetic module 124 incorporated in the microcomputer 12.

Next, referring to flow chart shown in FIG. 2 description will be made of operation of the motor-driven power steering control apparatus according to the first embodiment of the present invention on the presumption that the operation is executed softwarewise by the microcomputer 12.

Figure 2:
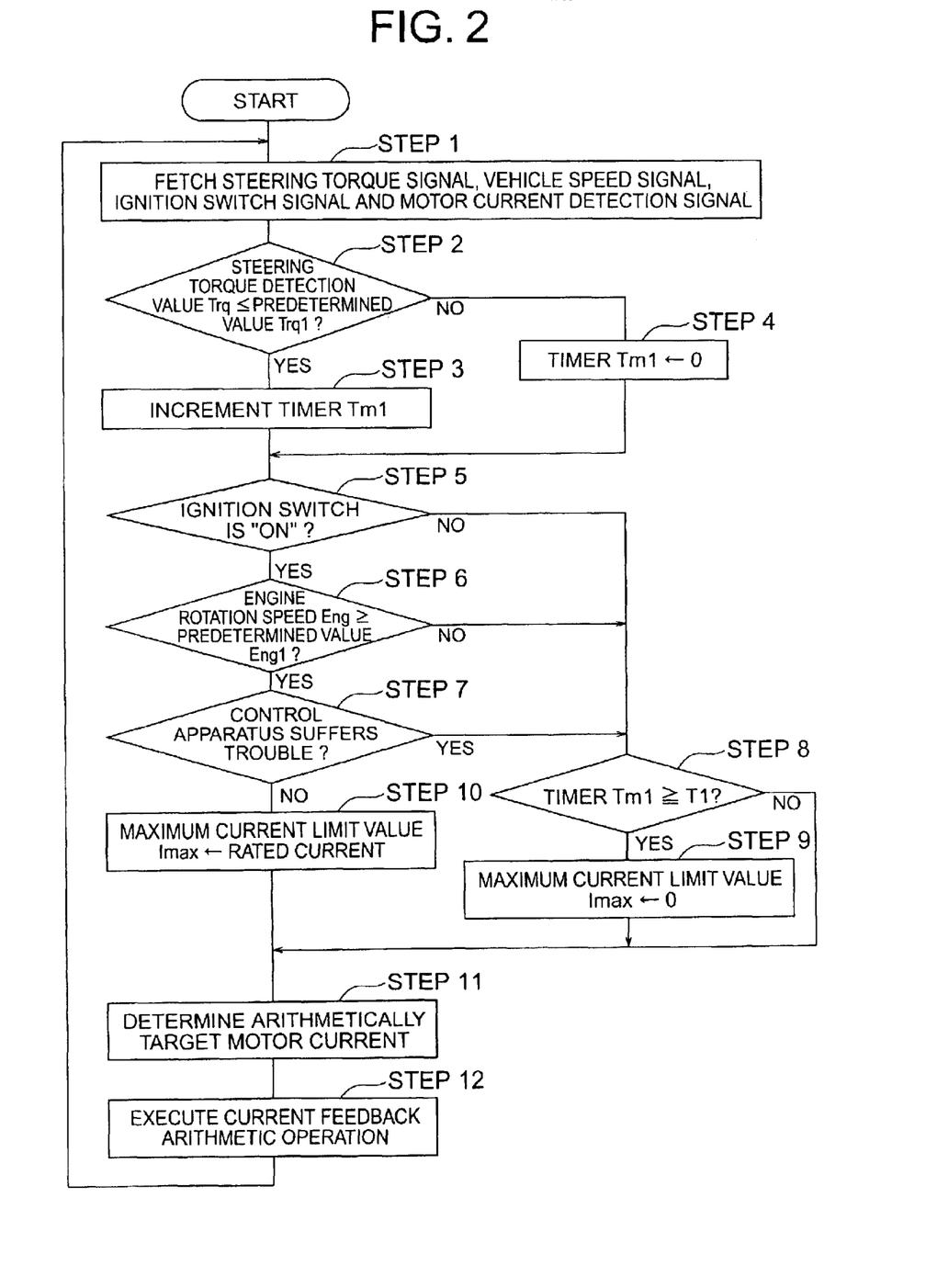
FIG. 2 is a flow chart for illustrating operation of the motor-driven power steering control apparatus according to the first embodiment of the present invention.

The processing procedure illustrated in FIG. 2 is sequentially executed as a processing routine by the microcomputer 12 every control period p1.

Now referring to FIG. 2, the steering torque signal, the vehicle speed signal, the engine rotation speed signal, the ignition switch signal and the motor current detection signal are fetched in a step 1.

Subsequently, decision is made as to whether or not such steering state is prevailing in which a reverse steering force due to torsion or twist of tires taking place upon application of the steering assist torque exists to bring about a torque variation (i.e., change of torque) upon stoppage of application of the steering assist torque. (This state will hereinafter be referred to as the kickback state or simply as the kickback.)

More specifically, so long as the steering torque detection value Trq remains not greater than a predetermined value Trq1, it is decided that kickback is insignificant or negligible upon stopping or clearing of the application of the steering assist torque. In that case, it is determined that the steering state is such that the torque variation can not be perceived by the driver. On the other hand, when the steering torque detection value Trq is greater than the predetermined value Trq1, kickback is significant or large. Thus, the steering state is determined such that the torque variation is perceived by the driver (step 2).

When it is determined in the step 2 that the steering state is such that the kickback is small and no torque variation can be perceived (i.e., when the decision step 2 results in affirmation "YES"), a timer Tm1 is incremented (step 3). On the contrary, when it is determined in the step 2 that such steering state is prevailing in which the kickback is large and thus the torque variation can be perceived (i.e., when the step 2 results in negation "NO"), the timer Tm1 is then cleared to zero and the step 3 is skipped.

In this way, the time duration of the state in which the kickback is sufficiently small can be measured with the timer Tm1.

At this juncture, it should be mentioned that by setting the predetermined value Trq1 at a value (e.g. not greater than 1 Nm) at which the driver can not perceive change or variation of the steering torque even when application of the steering assist torque is stopped or interrupted, it is possible to make the driver not perceive the torque variation upon interruption of application of the steering assist torque with the kickback being suppressed to a small magnitude.

In succession, decision is made as to whether a request for stopping the driving operation of the electric motor 7 on the basis of the on/off state of the ignition switch 5, the engine rotation speed (rpm) and the operative state of the motor-driven power steering control apparatus.

At first, it is decided whether or not the ignition switch 5 is closed "ON" (step 5).

When it is decided that the ignition switch 5 is in the closed state "ON" (i.e., when the step 5 results in "YES"), it is then decided whether or not the engine rotation speed (rpm) Eng is greater than a predetermined value Eng1 inclusive (i.e., whether the engine is operating or not) in a step 6.

In the case it is decided in the step 5 that the ignition switch 5 is in the opened or "OFF" state (i.e., when the step 5 results in "NO"), it is determined that the command for stopping the driving operation of the electric motor 7 has been issued, whereon the processing proceeds to a step 8 while skipping the steps 6 and 7.

When it is decided in the step 6 that the engine rotation speed (rpm) Eng is greater than the predetermined value Eng1 inclusive (i.e., step 6 is "YES"), indicating that the engine is operating, decision is then made as to whether the motor-driven power steering control apparatus suffers or not a trouble or failure in the step 7.

On the other hand, when it is determined in the step 6 that the engine rotation speed (rpm) Eng is smaller than the predetermined value Eng1 (i.e., when step 6 is "NO"), indicating that the engine operation is stopped, it is then decided that the command for stopping the driving operation of the electric motor 7 has been issued, whereon the processing proceeds to the step 8 while skipping the step 9.

When it is decided in the step 7 that the motor-driven power steering control apparatus suffers trouble (i.e., when the step 7 is "YES"), it is then determined that the command for stopping the driving operation of the electric motor 7 has been issued, whereon the processing proceeds to the step 8. By contrast, when the decision in the step 7 shows that the motor-driven power steering control apparatus is not suffering any trouble (i.e., when the step 7 is "NO"), it is then determined that the command or request for the driving operation of the motor 7 is continuously been validated. In that case, a maximum current limit value Imax of the electric motor 7 is set to a rated current value for sustaining continuously the application of the steering assist torque (step 10), whereon the processing proceeds to a step 11.

In the step 8, decision is made as to whether or not the count value of the timer Tm1 is greater than a predetermined value T1 inclusive by referencing the value of the timer Tm1.

When it is determined in the step 8 that the count value of the timer Tm1 is greater than the predetermined value T1 inclusive (i.e., when the step 8 is "YES"), it is then decided that the steering state in which the torque variation due to the kickback is sufficiently small has continued and the driver will not perceive the torque variation even when the application of the steering assist torque is stopped. In succession, the maximum current limit value Imax of the electric motor 7 is set to zero in order to stop the application of the steering assist torque, whereupon the processing proceeds to a step 11 while skipping the step 10.

By contrast, when decision in the step 8 shows that the count value of the timer Tm1 is smaller than the predetermined value T1 (i.e., when the step 8 is "NO"), it is then determined that the detected value of the steering torque is small only temporarily and that there still exists the possibility of occurrence of the kickback even though the request or command for stopping the operation of the electric motor 7 is validated as the results of the decision that the ignition switch 5 is in the off-state (step 5), the engine operation is stopped (step 6) and that the motor-driven power steering control apparatus suffers the trouble (step 7). In this case, the processing proceeds to a step 11 by skipping the steps 9 and 10.

Figure 3:
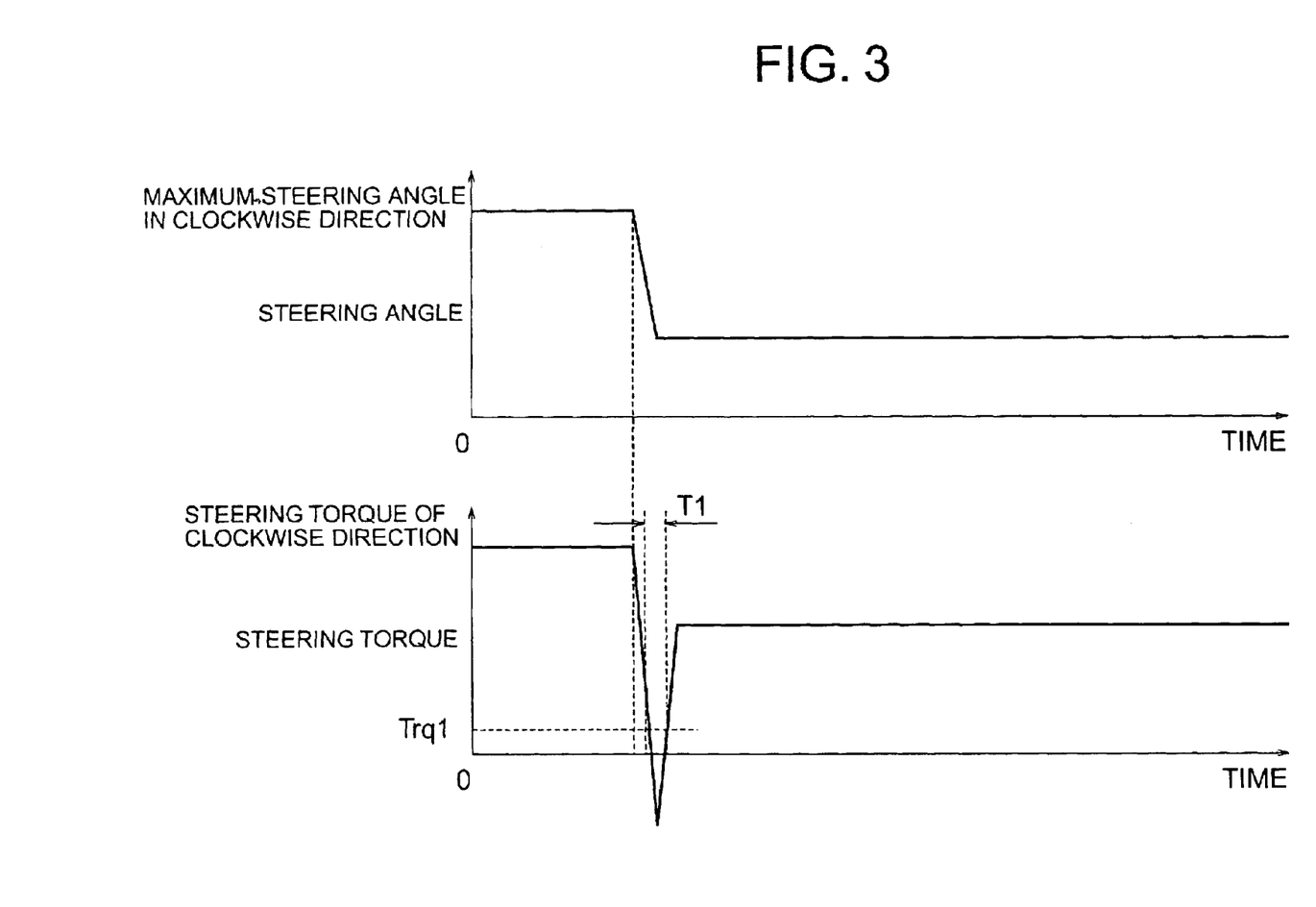
FIG. 3 is a view for illustrating graphically relations among a steering angle, a steering torque and time in the case where a steering handle is quickly manipulated.

At this juncture, description will be made of a relation between the steering torque and the time when the steering wheel or handle is quickly manipulated. FIG. 3 is a view for illustrating graphically relations among the steering angle, the steering torque and the time in the case where the steering handle is quickly manipulated.

Referring to FIG. 3, when the steering handle is manipulated from the right to the left, the steering angle in the clockwise direction decreases with the steering torque in the clockwise direction decreasing correspondingly. The detected value of the steering torque will then become equal to or smaller than the predetermined value Trq1. In the state where the detected steering torque becomes equal to or smaller than the predetermined value Trq1, driving operation of the electric motor 7 is stopped. In this conjunction, it is to be added that when the time duration of the steering torque extending from the time point at which the steering torque assumes the predetermined value Trq1 up to the time point at which stoppage of application of the steering assist torque is decided with the driving operation of the electric motor 7 being stopped is set to be 10 milliseconds or more (see FIG. 3, T1), the stoppage of the driving operation of the electric motor can be decided even when the steering handle is quickly manipulated in the reverse direction. Besides, erroneous decision as to the stoppage of application of the steering assist torque due to noise or the like can be prevented. Furthermore, by setting the predetermined value T1 to be 1 second or less, it is possible to stop the application of the steering assist torque when the steering manipulation is really stopped without bringing about the stoppage of application of the steering assist torque when the steering handle is quickly manipulated. As is apparent from the above, by setting the aforementioned time duration within a range of 10 ms to 1 sec, application of the steering assist torque can be stopped without fail. The time duration T1 can be set as desired.

Figure 4:
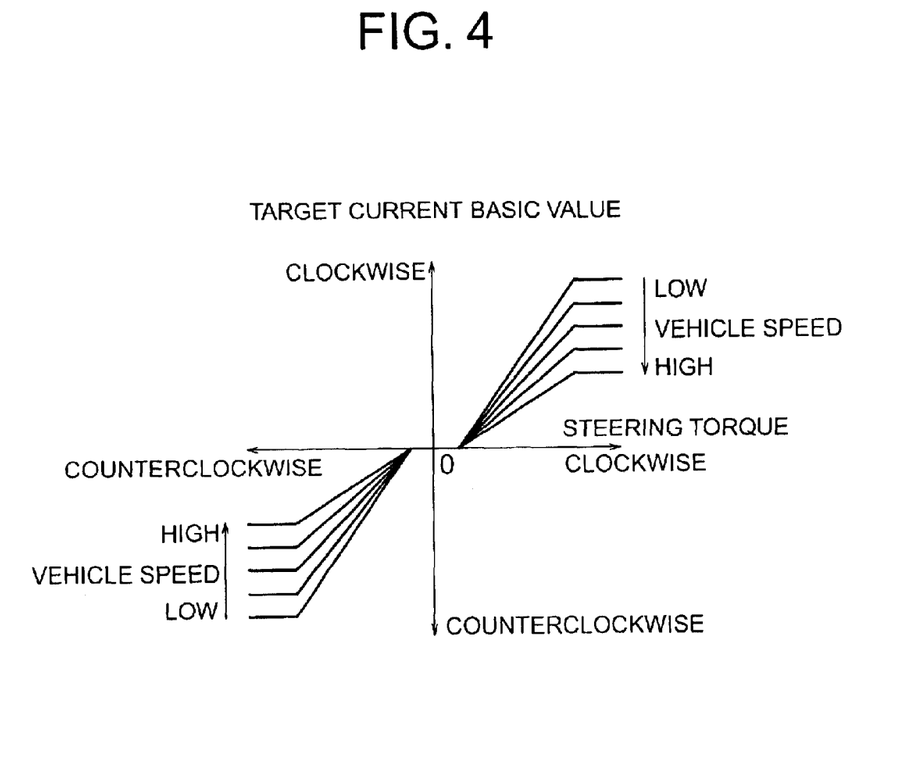
FIG. 4 is a view for illustrating graphically relations among a vehicle speed, a steering torque and a target current basic value.

In succession, on the basis of the vehicle speed and the steering torque fetched in the step 1, a target current basic value for the electric motor 7 is arithmetically determined on the basis of relations shown in FIG. 4 which illustrates graphically relations among the vehicle speed, the steering torque and the target current basic value.

In this conjunction, it should be added that the target current basic value as determined arithmetically is restricted to a value which does not exceed the maximum current limit value Imax. The target current basic value limited in this manner is established as the target motor current value (step 11).

In succession, the current feedback control is carried out on the basis of the target motor current value and the motor current detection value to thereby derive arithmetically the motor driving signal for driving the motor driving circuit 14 (step 12).

The motor driving circuit 14 drives the electric motor 7 on the basis of the motor driving signal while controlling the electric motor 7 such that the difference between the motor current detection value and the target motor current value becomes zero, whereupon the step 1 is resumed.

Figure 5:
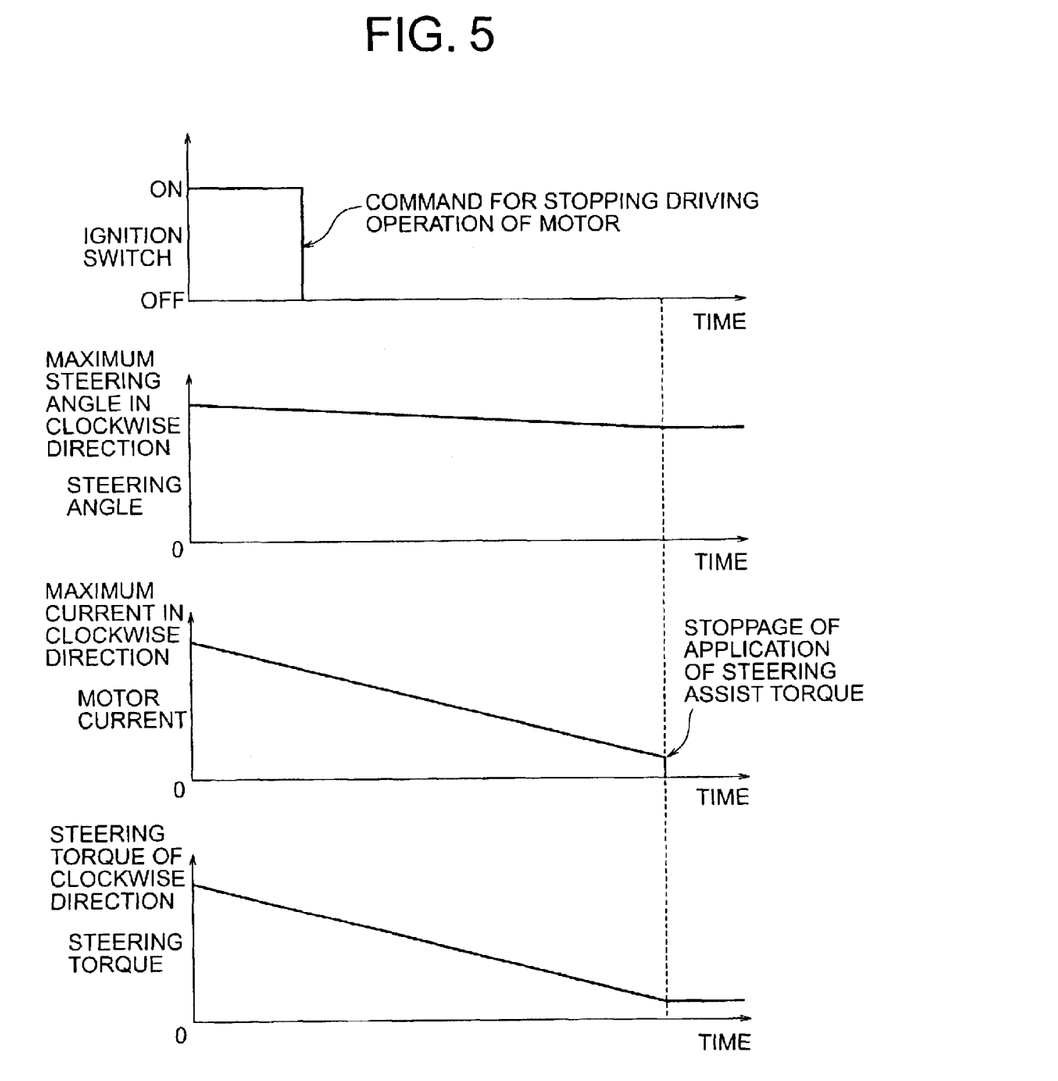
FIG. 5 is a view for illustrating graphically operation of the motor-driven power steering control apparatus according to the first embodiment of the present invention.

FIG. 5 is a view for illustrating graphically the operations of the motor-driven power steering control apparatus according to the first embodiment of the present invention. Referring to FIG. 5, when the driver gradually releases the steering manipulation after turning off the ignition switch (IG) 5, then the steering torque and the motor current decreases gradually. When the state in which the steering torque is smaller than the predetermined value T1 inclusive has continued for a predetermined time, the motor driving circuit 14 sets the motor current to be zero to thereby stop application of the steering assist torque.

In this manner, when the request for stopping the driving operation of the electric motor 7 is issued, application of the steering torque is stopped when the state in which the steering torque is equal to or smaller than the predetermined value T1 has been continued for the predetermined time. Thus, the steering status can be determined accurately, whereby the driving of the electric motor can be stopped by interrupting the motor current at an appropriate timing while suppressing the torque variation due to kickback and ensuring comfortableness for the steering operation.

Embodiment 2

The motor-driven power steering control apparatus according to the first embodiment of the present invention is so arranged as to monitor the detected value of the steering torque and stop application of the steering assist torque at the time point when it is determined that possibility of the torque variation due to the kickback has diminished. In the motor-driven power steering control apparatus according to a second embodiment of the present invention, such arrangement is adopted that instead of monitoring the detected value of the steering torque, a predetermined state quantity corresponding to or representative of the output of the electric motor 7 is monitored.

Figure 6:
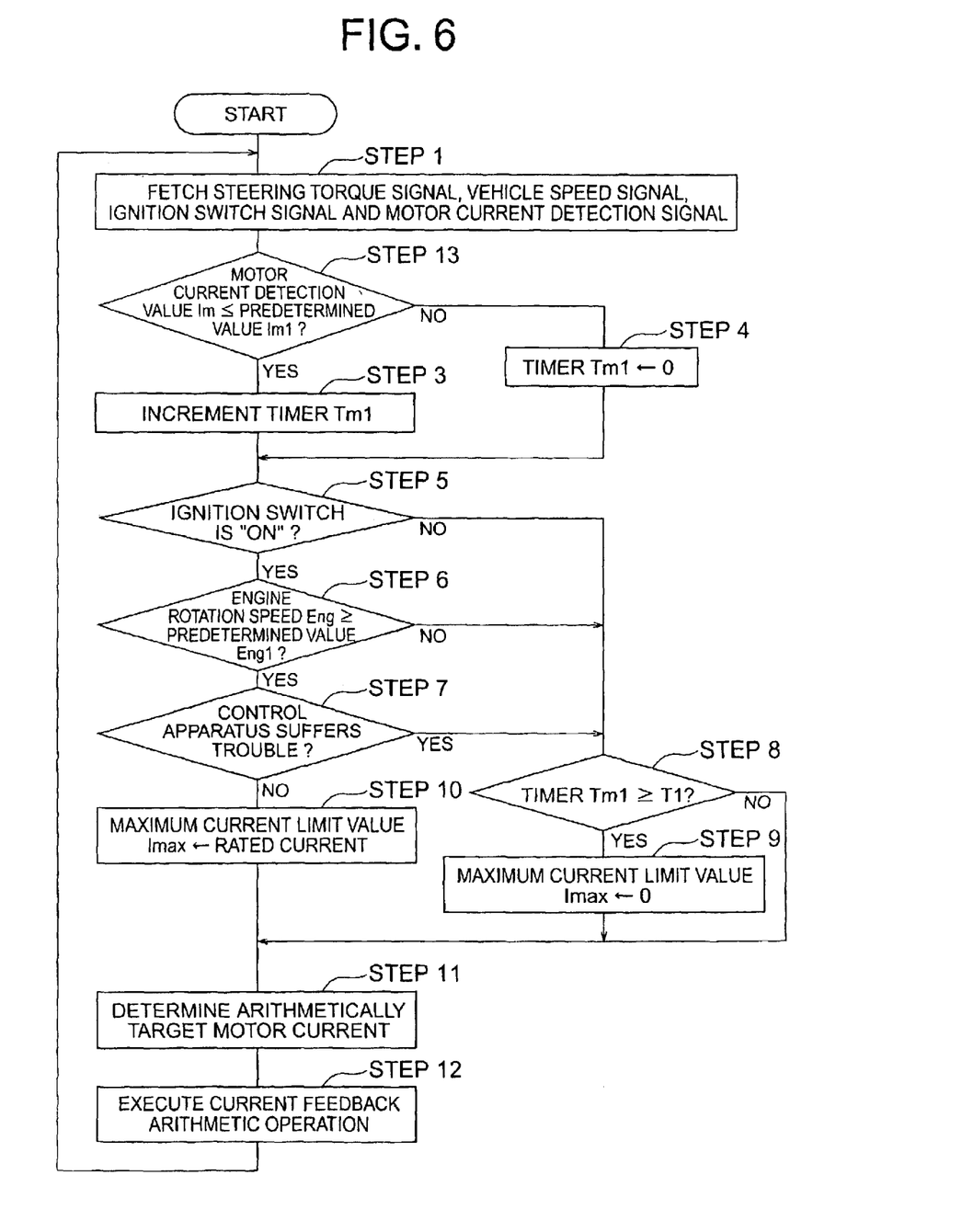
FIG. 6 is a flow chart for illustrating operation of the motor-driven power steering control apparatus according to a second embodiment of the present invention.

FIG. 6 is a flow chart for illustrating operation of the motor-driven power steering control apparatus according to the second embodiment of the present invention. In FIG. 6, operation or processing steps same as those described hereinbefore by reference to FIG. 2 are denoted by like reference numerals and repeated description thereof is omitted.

According to the teaching of the invention incarnated in the instant embodiment, application of the steering assist torque is stopped when a predetermined state quantity corresponding to the output of the electric motor 7 assumes a value equal to or smaller than a predetermined value with a view to suppressing the torque variation.

In the motor-driven power steering control apparatus according to the instant embodiment of the invention, it is presumed that a motor current which bears a proportional relation to the output torque of the electric motor 7 is made use of as the state quantity mentioned above.

Now referring to FIG. 6, upon inputting of the various signals from the various types of sensors (step 1), decision is made as to whether the motor current detection value Im detected by the motor current detecting circuit 13 is smaller than a predetermined value Im1 inclusive (step 13).

When it is determined in the step 13 that the motor current detection value Im is smaller than the predetermined value Im1 inclusive (i.e., when the step 13 results in "YES"), the timer for measuring the time for which the motor current detection value Im continues to remain smaller than the predetermined value Im1 inclusive is incremented (step 3).

On the other hand, when it is determined in the step 13 that the motor current detection value Im is greater than the predetermined value Im1 (i.e., when the step 13 results in "NO"), the timer is cleared to zero.

In this way, the time duration of the state in which the torque variation due to the kickback is expected to remain sufficiently small regardless of stoppage of application of the steering assist torque is measured.

Subsequently, through the processings similar to those described hereinbefore, the time for which the motor current detection value continues to remain smaller than the predetermined value inclusive is measured, and upon issuance of the request or command for stopping the driving operation of the electric motor 7 due to opening of the ignition switch, decreasing of the engine rotation speed (rpm) and/or the trouble of the motor-driven power steering control apparatus, application of the steering assist torque is stopped on the condition that the time duration which is to be shorter than the predetermined value Im1 inclusive has reached or exceeded the predetermined value.

As is apparent from the above, it is possible to determine with high accuracy the steering state to thereby stop the driving operation of the electric motor 7 while suppressing torque variation and ensuring comfortableness for the steering manipulation by deciding the stoppage of application of the steering assist torque on the basis of the motor current detection value Im which bears a proportional relation to the steering torque of the electric motor.

Incidentally, in the motor-driven power steering control apparatus according to the instant embodiment of the invention, it has been presumed that decision as to occurrence possibility of the kickback is realized by making use of the motor current detection value Im. It goes however without saying that the decision as to the kickback possibility can equally be realized with the target motor current value determined arithmetically on the basis of the vehicle speed and the steering torque, substantially to the same aimed effect.

Embodiment 3

In the case of the motor-driven power steering control apparatus according to the second embodiment of the invention, possibility of the torque variation due to the kickback is determined by making use of the motor current as the state quantity representative of the output state of the electric motor 7. A third embodiment of the invention is directed to such arrangement that a motor-applied voltage, i.e., voltage applied to the electric motor 7, is employed in place of the motor current.

Figure 7:
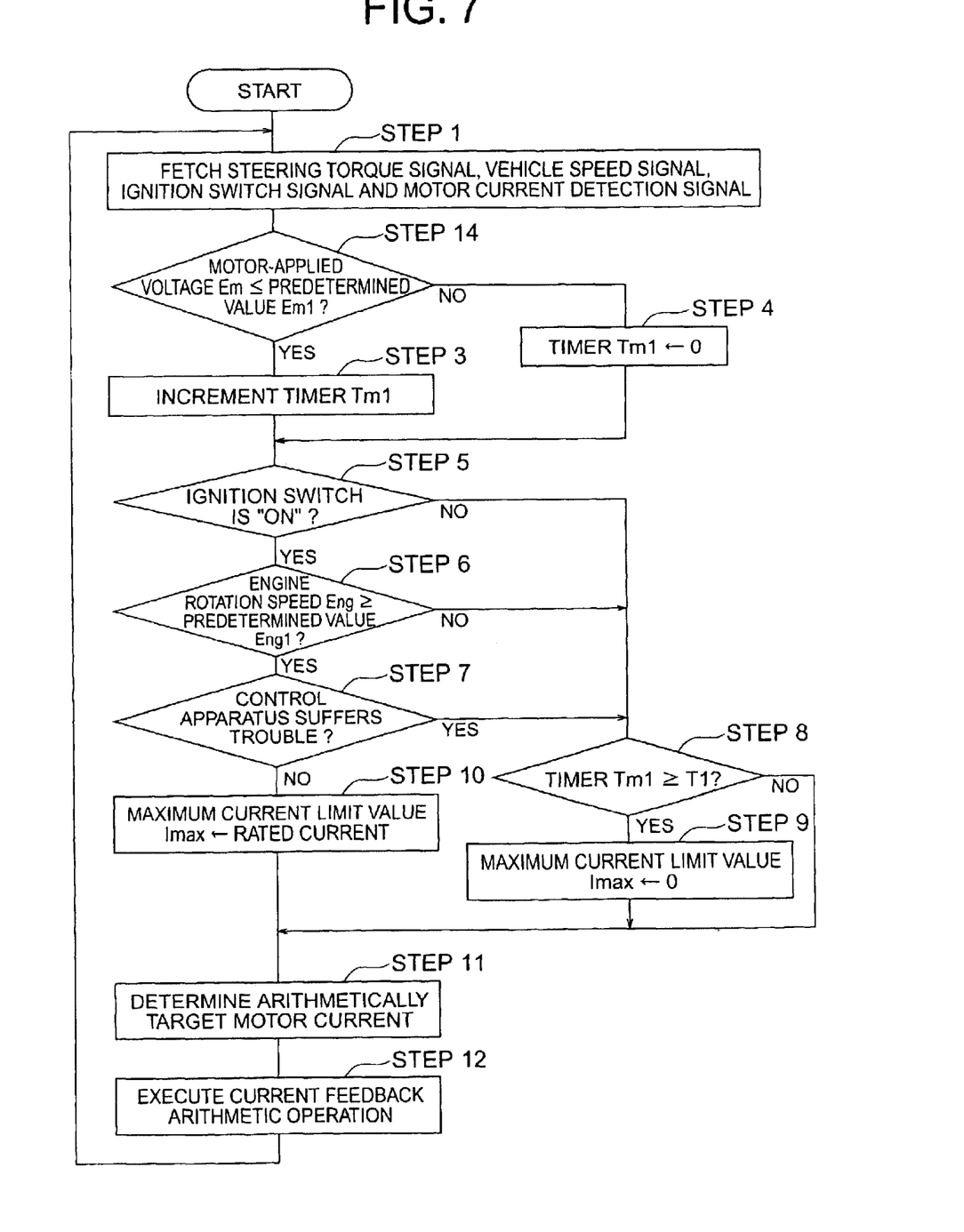
FIG. 7 is a flow chart for illustrating operation of the motor-driven power steering control apparatus according to a third embodiment of the present invention.

FIG. 7 is a flow chart for illustrating operation of the motor-driven power steering control apparatus according to the third embodiment of the present invention. In FIG. 7, operation or processing steps same as those described hereinbefore by reference to FIG. 2 are denoted by like reference numerals. Accordingly, repeated description thereof will be unnecessary.

According to the teaching of the invention incarnated in the instant embodiment, application of the steering assist torque is stopped when the predetermined state quantity representative of the output state of the electric motor 7 assumes a value equal to or smaller than a predetermined value with a view to suppressing the torque variation.

In the motor-driven power steering control apparatus according to the instant embodiment of the invention, it is presumed that the motor-applied voltage of the electric motor 7 is made use of as the state quantity mentioned above.

Now referring to FIG. 7, upon inputting of the various signals from the various types of sensors (step 1), decision is made as to whether a motor-applied voltage value Em arithmetically determined by the microcomputer 12 in the course of the preceding processing routine is smaller than a predetermined value Em1 inclusive (step 14).

When it is determined in the step 14 that the motor-applied voltage value Em is smaller than the predetermined value Em1 inclusive (i.e., when the step 14 results in "YES"), the timer for measuring the time for which the motor-applied voltage value Em continues to remain smaller than the predetermined value Em1 inclusive is incremented (step 3).

On the other hand, when it is determined in the step 14 that the motor-applied voltage value Em is greater than the predetermined value Im1 (i.e., when the step 14 results in "NO"), the timer is cleared to zero.

In this way, the time duration of the state in which the motor-applied voltage is small and the torque variation due to the kickback is expected to be sufficiently small regardless of stoppage of application of the steering assist torque is measured.

In succession, through the processings similar to those described hereinbefore, the time for which the motor-applied voltage value continues to remain smaller than the predetermined value inclusive is measured, and upon issuance of the command for stopping the driving operation of the electric motor 7 due to opening of the ignition switch, decreasing of the engine rotation speed (rpm) and/or the trouble of the motor-driven power steering control apparatus, application of the steering assist torque is stopped on the condition that the time duration which the motor-applied voltage value is to be smaller than the predetermined value inclusive has reached or exceeded the predetermined time.

As is apparent from the above, by deciding the stoppage of application of the steering assist torque on the basis of the motor-applied voltage, it is possible to determine with high accuracy the steering state to thereby stop the driving operation of the electric motor 7 while suppressing the torque variation and thus ensuring comfortableness for the steering manipulation.

In this conjunction, it is noted that even if the output torque is small, the motor-applied voltage value becomes high when the rotation speed of the electric motor 7 is high. Even in that case, application of the steering assist torque can be continued so far as the steering speed is high with the load being small because the decision can be made by making use of the voltage applied to the load. In the motor-driven power steering control apparatus according to the third embodiment of the invention, decision as to the possibility of kickback is performed on the basis of the motor-applied voltage. It should however be understood that by turning on/off the power supply of the battery 6 at a constant ratio by means of the current feedback (F/B) arithmetic module 124 to thereby control the voltage applied to the electric motor 7 on an average, decision as to the possibility of kickback can equally be realized on the basis of the on/off ratio of the power supply from the battery 6 (i.e., PWM drive-duty ratio).

Further, by providing the means for detecting the terminal voltage of the electric motor 7, it is possible to determine the steering state with high accuracy on the basis of the terminal voltage as detected, whereby the operation of the electric motor 7 can be stopped while ensuring comfortableness for the steering manipulation.

Embodiment 4

In the motor-driven power steering control apparatuses described above in conjunction with the first to third embodiments of the invention, when the state in which the detected value of the steering torque becomes greater than the predetermined value inclusive after riding on, for example, a curbstone is left as it is regardless of issuance of the command for stopping the driving operation of the electric motor, power consumption of the battery 6 will continue, to a disadvantage. A fourth embodiment of the present invention is arranged to cope with the undesirable situation such as mentioned above by stopping application of the steering assist torque at a time point at which a predetermined time has lapsed since issuance of the command for stopping application of the steering assist torque and thus the steering operation is considered as having been completed.

Figure 8:
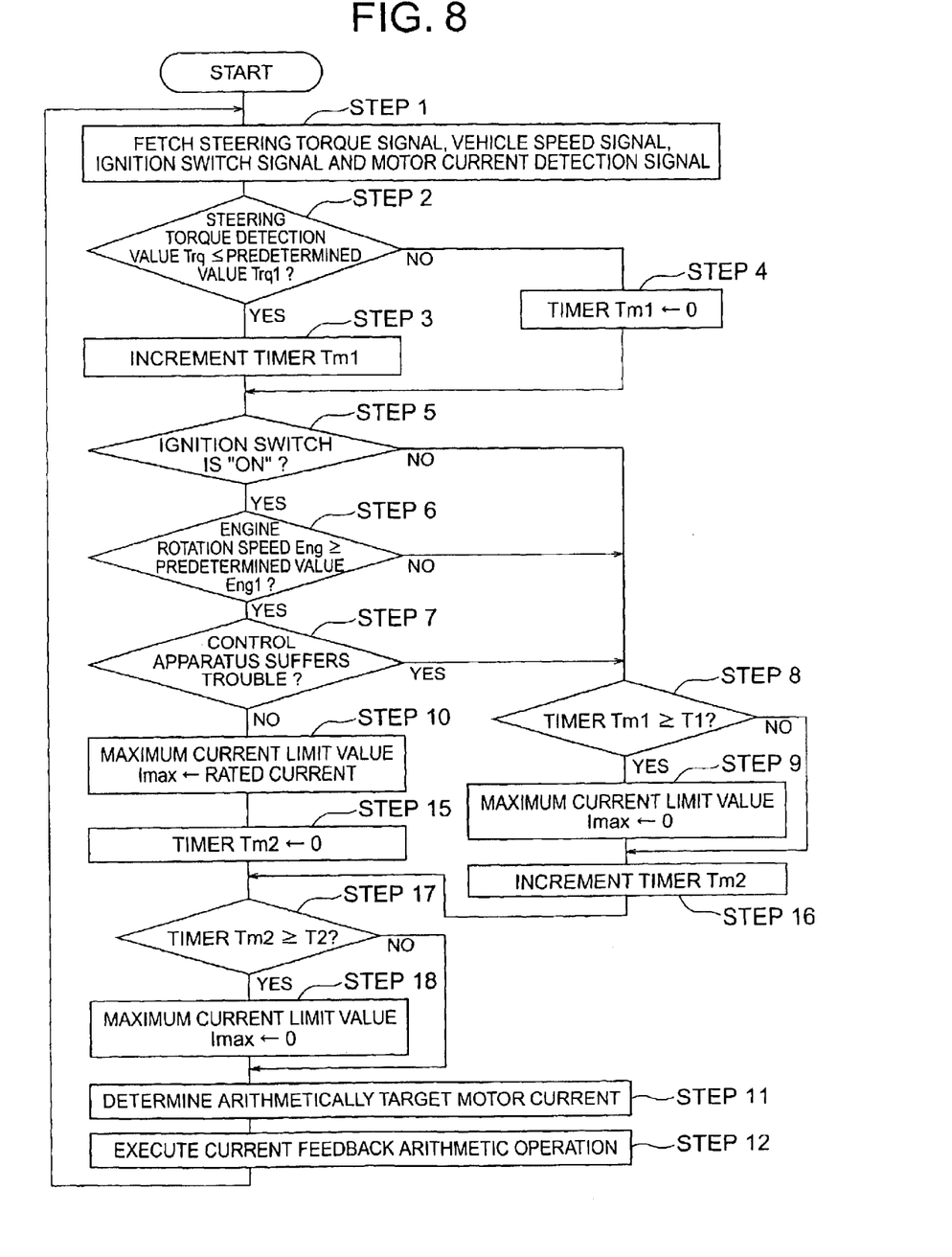
FIG. 8 is a flow chart for illustrating operation of the motor-driven power steering control apparatus according to a fourth embodiment of the present invention.

FIG. 8 shows a flow chart for illustrating processing operation performed by the motor-driven power steering control apparatus according to the fourth embodiment of the present invention. Incidentally, in FIG. 8, the processings essentially same as those described hereinbefore by reference to FIG. 2 are denoted by like reference numerals and repeated description thereof is omitted.

Referring to FIG. 8, the time lapse of the state in which the steering torque detection value Trq is smaller than the predetermined value Trq1 inclusive is measured. In the meanwhile, when the command for driving operation of the electric motor 7 is issued by the ignition switch or other, the timer Tm2 destined for measuring the time lapse since the issuance of the command for stopping the driving operation of the electric motor 7 is cleared to zero (step 15).

On the other hand, when the request or command for stopping the driving operation of the electric motor 7 is issued by the ignition switch or the like, the timer Tm2 is incremented to thereby measure the time lapse since the issuance of the motor operation stop command (step 16).

In succession, decision is made whether or not the count value of the timer Tm2 is greater than a predetermined value T2 inclusive (step 17).

When it is determined in the step 17 that the count value of the timer T2 is greater than the predetermined value T2 inclusive (i.e., when the decision step 17 results in affirmation "YES"), the maximum current limit value Imax of the electric motor 7 is cleared to zero to thereby stop the operation of the electric motor 7. Thus, the power consumption of the battery 6 can be reduced (step 18).

On the other hand, when it is decided in the step 17 that the count value of the timer T2 is smaller than the predetermined value T2 (i.e., when the decision step 17 results in negation "NO"), the step 18 is skipped.

In succession, the target motor current value is arithmetically determined through the similar procedure described previously (step 11), whereupon the current feedback operation is carried out on the basis of the detected value and the target value of the motor current (step 12).

In this conjunction, the problem of kickback can be solved by steering reversely several ten degrees to thereby release the tires or the like from the twisted state. Thus, the predetermined value T2 mentioned above may be so selected as to be sufficiently longer than the time taken for steering reversely several ten degrees while performing the steering manipulation slowly. Typically, the predetermined value T2 may be set to be ten seconds or less. In this way, the steering assist torque can be interrupted with high reliability, whereby the power consumption of the battery 6 can be suppressed.

As is apparent from the above, by stopping application of the steering assist torque when a predetermined time has lapsed since the issuance of request or command for stopping operation of the electric motor 7, it is possible to stop the driving operation of the motor 7 without being accompanied with torque variation even in the case where the state in which the steering torque is greater than the predetermined value is left as it is after the motor vehicle rode on, for example, a curbstone. In this way, the power consumption of the battery 6 can be suppressed to a minimum.

Embodiment 5

The motor-driven power steering control apparatuses according to the first to fourth embodiments of the invention are so arranged as to prevent variation of the torque upon stopping of the application of the steering assist torque. The motor-driven power steering control apparatus according to a fifth embodiment of the present invention is arranged to suppress the torque variation upon starting of application of the steering assist torque by making use of the steering torque.

Figure 9:
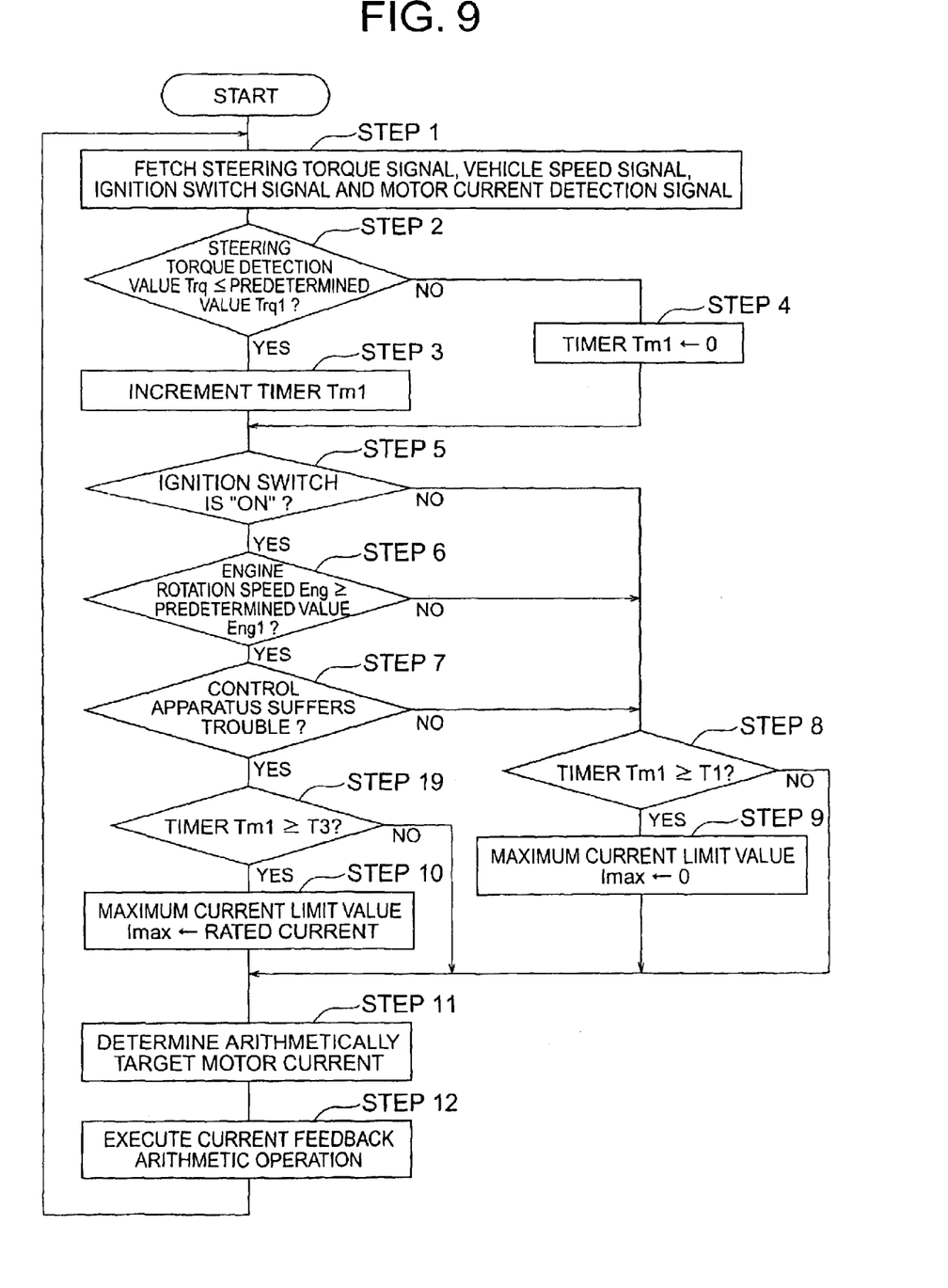
FIG. 9 is a flow chart for illustrating operation of the motor-driven power steering control apparatus according to a fifth embodiment of the present invention.

FIG. 9 is a flow chart for illustrating operation of the motor-driven power steering control apparatus according to the fifth embodiment of the present invention. In FIG. 9, operation or processing steps same as those described hereinbefore by reference to FIG. 2 are denoted by like reference numerals and repeated description thereof is omitted.

Referring to FIG. 9, the time lapse of the state in which the steering torque detection value Trq is smaller than the predetermined value Trq1 inclusive is measured. In the meanwhile, when the command for driving operation of the electric motor 7 is issued by the ignition switch 5 or other, decision is made as to whether or not the time period Tm1 in which the steering torque detection value Trq remains continuously smaller than the predetermined value Trq1 inclusive is greater than a predetermined value T3 inclusive (step 19).

When it is determined in the step 19 that the time duration Tm1 for which the steering torque detection value Trq has continuously been smaller than the predetermined value Trq1 inclusive is greater than the predetermined value T3 (i.e., when the step 19 results in "YES"), it is then decided that the steering assist torque is sufficiently small and thus the torque variation brought about upon starting of the steering assist torque is negligible.

In a succeeding step 10, the maximum current limit value Imax of the electric motor 7 is set to the rated current, which is then followed by a step 11 where the target motor current value conforming to the steering torque is arithmetically determined.

When it is determined in the step 19 that the time duration Tm1 for which the steering torque detection value Trq has continuously been smaller than the predetermined value Trq1 inclusive is shorter than the predetermined value T3 (i.e., when the step 19 results in "NO"), the step 10 is skipped, and the target motor current value conforming to the steering torque is limited by the maximum current limit value Imax arithmetically determined in the preceding processing routine (step 11).

By virtue of the arrangement that upon issuance of the request or command for starting the driving operation of the electric motor 7, application of the steering assist torque is started only when the state in which the detected steering torque value Trq is smaller than the predetermined value Trq1 has continued for a predetermined time, as described above, variation of torque can satisfactorily be suppressed by determining the steering state with high accuracy. In this manner, the driving operation of the assist torque generating motor 7 can be started by feeding the current thereto at an optimal time point while ensuring comfortableness for the steering operation.

Effects of the Invention

As is apparent from the foregoing, the present invention has provided the motor-driven power steering control apparatus for the motor vehicle which apparatus includes the electric motor for generating and applying the steering assist torque to a steering system of a motor vehicle, the steering torque detecting means for detecting the steering torque of the steering system, the motor driving means for operating the electric motor in dependence on the detected value of the steering torque, the motor operation command means for commanding starting and stopping of the driving operation of the electric motor, and the motor operation decision means for deciding starting and stopping of the driving operation of the electric motor on the basis of the command issued by the motor operation command means. The motor operation decision means is so arranged that when stopping of the driving operation of the electric motor is commanded by the motor operation command means, the motor operation decision means stops the driving operation of the electric motor while commanding the motor driving means to stop the application of the steering assist torque, provided that the state in which the detected value of the steering torque is not greater than the value predetermined for stopping the driving operation of the electric motor has continued for a time period predetermined for the stoppage.

By virtue of the arrangement described above, there can be realized the motor-driven power steering control apparatus which is capable of determining the steering status accurately, whereby the application of the steering assist torque can be stopped by interrupting the motor current at an appropriate timing while suppressing the torque variation due to kickback and ensuring comfortableness for the steering manipulation.

Many modifications and variations of the present invention are possible in the light of the above techniques. It is therefore to be understood that within the scope of the appended claims, the invention may be practiced otherwise than as specifically described.

What is claimed is:

1. A motor-driven power steering control apparatus for a motor vehicle, comprising:
   an electric motor for applying a steering assist torque to a steering system of said motor vehicle;
   steering torque detecting means for detecting a steering torque of said steering system;
   motor driving means for operating said electric motor in dependence on a detected value of said steering torque;
   motor operation command means for commanding starting and stopping of driving operation of said electric motor; and
   motor operation decision means for deciding starting and stopping of the driving operation of said electric motor on the basis of a command issued by said motor operation command means,
   wherein said motor operation decision means is so arranged that when stopping of the driving operation of said electric motor is commanded by said motor operation command means, said motor operation decision means stops the driving operation of said electric motor while commanding said motor driving means to stop application of said steering assist torque, provided that a state in which a detected value of said steering torque is not greater than a value predetermined for stopping the driving operation of said electric motor has continued for a time period predetermined for the stoppage.

2. A motor-driven power steering control apparatus for a motor vehicle, comprising:
   an electric motor for applying a steering assist torque to a steering system of said motor vehicle;
   steering torque detecting means for detecting a steering torque of said steering system;
   motor driving means for operating said electric motor by controlling a state quantity corresponding to output of said electric motor in dependence on a detected value of said steering torque;
   motor operation command means for commanding starting and stopping of driving operation of said electric motor; and
   motor operation decision means for deciding starting and stopping of the driving operation of said electric motor on the basis of a command issued by said motor operation command means,
   wherein said motor operation decision means is so arranged that when stopping of the driving operation of said electric motor is commanded by said motor operation command means, said motor operation decision means stops the driving operation of said electric motor while commanding said motor driving means to stop application of said steering assist torque, provided that a state in which a state quantity of said electric motor is not greater than a value predetermined for stopping the driving operation of said electric motor has continued for a time period predetermined for the stoppage.

3. A motor-driven power steering control apparatus according to claim 2,
   wherein said motor operation decision means is so designed as to make said decision on the basis of a current value of said driving motor adopted as said state quantity.

4. A motor-driven power steering control apparatus according to claim 2,
   wherein said motor operation decision means is so designed as to make said decision on the basis of a motor-applied voltage value adopted as said state quantity.

5. A motor-driven power steering control apparatus according to claim 2, further comprising:
   inter-terminal voltage detecting means for detecting an inter-terminal voltage value of said electric motor,
   wherein said motor operation decision means is so arranged as to make said decision on the basis of said inter-terminal voltage value adopted as said state quantity.

6. A motor-driven power steering control apparatus according to claim 1,
   wherein said time period predetermined for the stoppage is set to a time ranging from 0.01 second to 1 second.

7. A motor-driven power steering control apparatus according to claim 1,
   wherein said predetermined value for the stoppage is set to a value corresponding to a steering torque of 1 Nm.

8. A motor-driven power steering control apparatus according to claim 1,
   wherein said motor operation decision means is so arranged as to stop driving operation of said electric motor while commanding said motor driving means to stop application of said steering assist torque at a time point at which a predetermined operation time has lapsed since issuance of a command for stopping the driving operation of said electric motor by said motor operation command means.

9. A motor-driven power steering control apparatus according to claim 8,
   wherein said predetermined operation time is set to a value which is not greater than 10 seconds.

10. A motor-driven power steering control apparatus according to claim 1,
    wherein said motor operation decision means is so arranged as to start driving operation of said electric motor while commanding said motor driving means to start application of said steering assist torque at a time point at which a command for starting operation of said electric motor is issued by said motor operation command means, provided that a state in which the detected value of said steering torque is not greater than a value predetermined for starting operation of said electric motor has continued for a time period predetermined for starting the motor operation.

11. A motor-driven power steering control apparatus for a motor vehicle, comprising:
    an electric motor for applying a steering assist torque to a steering system of said motor vehicle;
    a steering torque detecting unit that detects a steering torque of said steering system;
    a motor driving unit that operates said electric motor in dependence on a detected value of said steering torque;
    a motor operation command unit to start and stop a drive operation of said electric motor; and
    a motor operation decision unit that decides a start and stop of the drive operation of said electric motor on the basis of a command issued by said motor operation command unit,
    wherein, application of said steering assist torque is stopped when a state where a detected value of said steering torque is less than or equal to a predetermined stopping value of the driving operation of said electric motor, continues for a predetermined stop time period.

12. A motor-driven power steering control apparatus for a motor vehicle, comprising:
    an electric motor for applying a steering assist torque to a steering system of said motor vehicle;

a steering torque detecting unit that detects a steering torque of said steering system;

a motor driving unit that operates said electric motor in dependence on a detected value of said steering torque;

a motor operation command unit to start and stop a drive operation of said electric motor; and a motor operation decision unit that decides a start and stop of the drive operation of said electric motor on the basis of a command issued by said motor operation command unit, wherein, application of said steering assist torque is stopped when a state where a state quantity of said electric motor is less than or equal to a predetermined stopping value of the driving operation of said electric motor, continues for a predetermined stop time period.

13. A motor-driven power steering control apparatus according to claim 12, wherein said motor operation decision unit is so designed as to make said decision on the basis of a current value of said driving motor adopted as said state quantity.

14. A motor-driven power steering control apparatus according to claim 12, wherein said motor operation decision unit is so designed as to make said decision on the basis of a motor-applied voltage value adopted as said state quantity.

15. A motor-driven power steering control apparatus according to claim 12, further comprising:

an inter-terminal voltage detecting unit for detecting an inter-terminal voltage value of said electric motor, wherein said motor operation decision unit is so arranged as to make said decision on the basis of said inter-terminal voltage value adopted as said state quantity.

16. A motor-driven power steering control apparatus according to claim 11, wherein said predetermined stop time period is set to a time ranging from 0.01 second to 1 second.

17. A motor-driven power steering control apparatus according to claim 11, wherein said predetermined stop time period is set to a value corresponding to a steering torque of 1 Nm.

18. A motor-driven power steering control apparatus according to claim 11, wherein application of said steering assist torque is stopped at a time point at which a predetermined operation time has lapsed since issuance of a command for stopping a driving operation of said electric motor by said motor operation command unit.

19. A motor-driven power steering control apparatus according to claim 18, wherein said predetermined operation time is set to a value which is not greater than 10 seconds.

20. A motor-driven power steering control apparatus according to claim 11, wherein application of said steering assist torque is started at a time point at which a command for a starting operation of said electric motor is issued by said motor operation command unit, and where a state in which the detected value of said steering torque is less than or equal to a predetermined starting value of said electric motor, has continued for a time period predetermined for starting the motor operation.

* * * * *